(12) United States Patent
Challagolla et al.

(10) Patent No.: US 10,937,241 B2
(45) Date of Patent: Mar. 2, 2021

(54) SYSTEMS, METHODS, AND APPARATUS FOR IDENTIFYING AN AUGMENTED REALITY SERVICE

(71) Applicant: The Travelers Indemnity Company, Hartford, CT (US)

(72) Inventors: Venu Challagolla, Avon, CT (US); John T. Prior, III, Manchester, CT (US); Bertrand L. Wilson, St. Paul, MN (US); Venkatraman Raman, Manchester, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 16/024,113

(22) Filed: Jun. 29, 2018

(65) Prior Publication Data
US 2020/0005540 A1 Jan. 2, 2020

(51) Int. Cl.
*G06T 19/00* (2011.01)
*G06T 7/50* (2017.01)
*G06K 9/00* (2006.01)
*G06F 16/54* (2019.01)
*G06F 16/58* (2019.01)

(52) U.S. Cl.
CPC ............ *G06T 19/006* (2013.01); *G06F 16/54* (2019.01); *G06F 16/5866* (2019.01); *G06K 9/00671* (2013.01); *G06T 7/50* (2017.01)

(58) Field of Classification Search
CPC ..... G06T 19/006; G06T 7/50; G06T 2215/16; G06F 16/5866; G06F 16/54; G06K 9/00671
See application file for complete search history.

(56) References Cited

U.S. PATENT DOCUMENTS

| 8,803,916 B1* | 8/2014 | Paczkowski | ............ G06T 11/60 345/629 |
| 9,536,355 B1* | 1/2017 | Kumar | ................... G01J 5/0025 |
| 2006/0232499 A1* | 10/2006 | Ebersole | ................ G09B 19/00 345/7 |
| 2015/0193982 A1* | 7/2015 | Mihelich | ................ H04W 4/026 345/633 |
| 2016/0098860 A1* | 4/2016 | Basra | ..................... H04L 67/325 345/633 |
| 2016/0189426 A1* | 6/2016 | Thomas | ................ G06T 19/006 345/633 |
| 2018/0168781 A1* | 6/2018 | Kopelman | ............ A61C 1/0015 |
| 2018/0211183 A1* | 7/2018 | Innes | ..................... G06Q 10/02 |
| 2019/0019090 A1* | 1/2019 | Chacko | .................. G06N 20/00 |

* cited by examiner

*Primary Examiner* — Ke Xiao
*Assistant Examiner* — Donna J. Ricks
(74) *Attorney, Agent, or Firm* — Fincham Downs LLC; Carson C. K. Fincham

(57) ABSTRACT

Systems, apparatus, methods, and articles of manufacture provide for managing and presenting historical environment information as virtual content in augmented reality (AR) environments and applications.

23 Claims, 13 Drawing Sheets

US 10,937,241 B2

SYSTEMS, METHODS, AND APPARATUS FOR IDENTIFYING AN AUGMENTED REALITY SERVICE

FIELD OF THE INVENTION

The present disclosure relates generally to augmented reality (AR) environments, including managing sensor data, historical information, and distance determinations.

BACKGROUND OF THE INVENTION

AR environments and applications enable a user, utilizing a user device, to view real-world environment information augmented with virtual content (e.g., the virtual content may be superimposed over the real-world environment information). Real-world and virtual information may be viewed simultaneously. The augmenting virtual information may be defined and/or presented in one or more layers (e.g., via the user device) and may be based on a locality or physical reference point.

However, prior art systems have failed to recognize or solve important problems related to: (i) determining distances between real-world and/or virtual objects; (ii) generating and adapting the spatial representation of virtual content based on virtual and/or real-world objects; (iii) maintaining and managing access to a variety of different types of virtual content; (iv) efficiently managing the providing of AR services to a large base of networked devices; (v) managing and adapting the presentation of different types and/or layers of virtual content in an AR environment; and (vi) presenting and facilitating the comparison of historical and real-time information for locations, structures, and objects.

SUMMARY OF THE INVENTION

According to some embodiments of the present invention, systems, methods, apparatus, articles of manufacture, and/or computer readable media provide a process for managing and presenting historical environment information as virtual content in AR environments and applications. In some embodiments, a process for providing AR services comprises one or more of the following steps:
 a) receiving environment information associated with a first time and with one or more of: a location and an environmental feature (e.g., image data associated corresponding to one or more real-world locations, structures, or other objects);
 b) generating historical virtual content based on the received environment information (e.g., creating and storing virtual representations of real-world objects as of the first time);
 c) receiving at a second time a request for the historical virtual content as augmented reality content, wherein the request is associated with the location and/or with the environmental feature;
 d) identifying the generated historical virtual content based on the location and/or with the environmental feature;
 e) executing an augmented reality service and generating augmented reality content corresponding to the request, the augmented reality content comprising the generated historical virtual content (e.g., wherein the augmented reality content comprises image data representing a difference between the historical virtual content and live image data); and
 f) transmitting the generated augmented reality content (e.g., to a mobile content access device) for overlaying live image data.

According to some embodiments of the present invention, a system provides for management of AR services in one or more AR environments and/or applications. In some embodiments, an AR system comprises:
 a) a request module configured to perform one or more of:
  receiving a request for augmented reality content from a mobile content access device,
  identifying at least one environmental feature associated with the request, and/or
  identifying a location associated with the request;
 b) a service selection module configured to identify an augmented reality service of a plurality of available augmented reality services, based on the identified at least one environmental feature and the identified location;
 c) an augmented reality generation module configured to execute the identified augmented reality service and to generate augmented reality content corresponding to the request; and
 d) a transmitting module configured to transmit the generated augmented reality content to the mobile content access device for overlaying live image data.

According to some embodiments of the present invention, systems, methods, apparatus, articles of manufacture, and/or computer readable media provide a process for management of AR services. In some embodiments, a process for managing AR services comprises the following steps:
 a) receiving a request for augmented reality content from a mobile content access device;
 b) identifying at least one environmental feature associated with the request;
 c) identifying a location associated with the request;
 d) identifying an augmented reality service of a plurality of available augmented reality services, based on the identified at least one environmental feature and the identified location;
 e) executing the identified augmented reality service and generating augmented reality content corresponding to the request; and
 f) transmitting the generated augmented reality content to the mobile content access device for overlaying live image data.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

Figure 1:
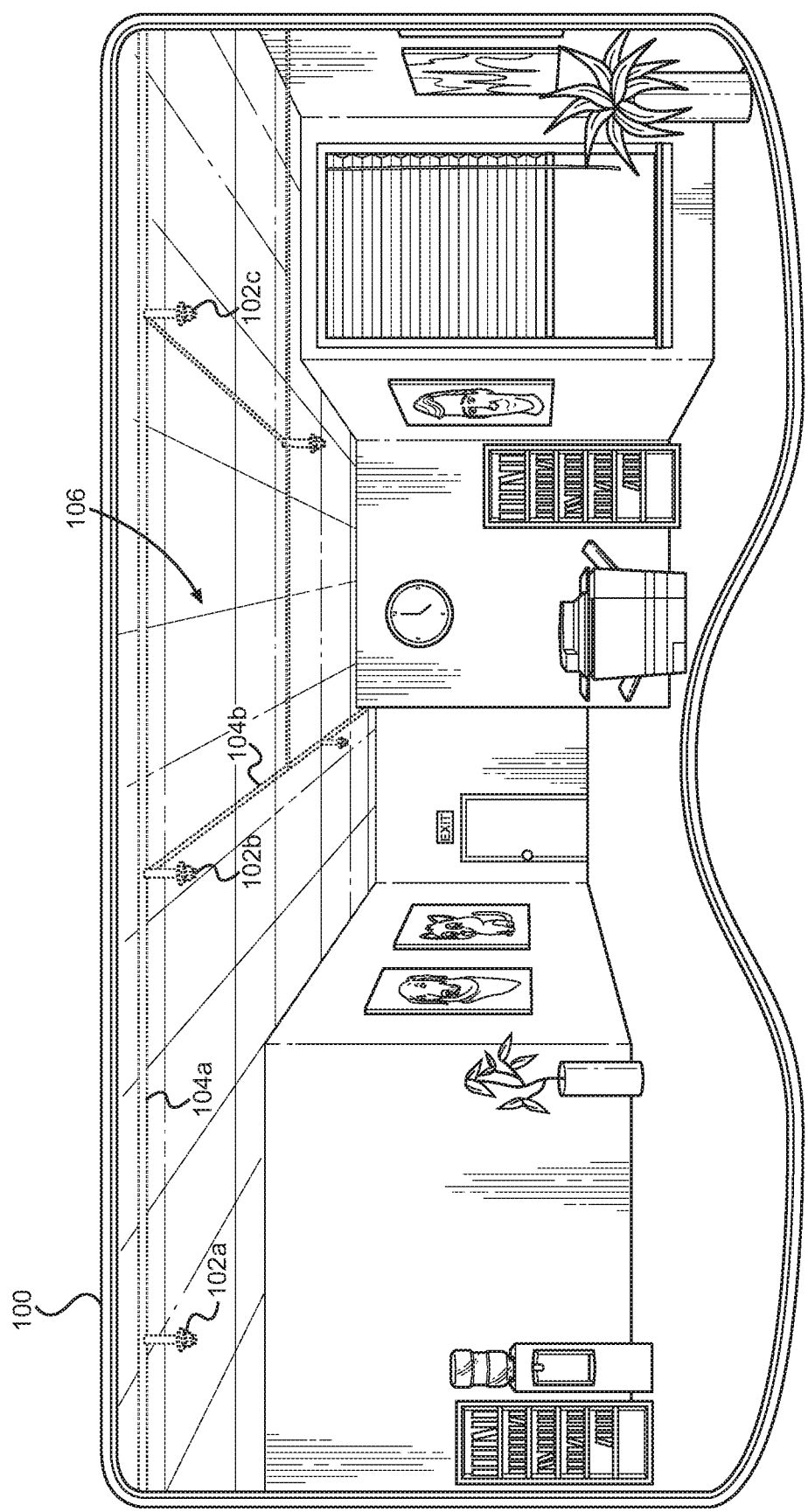
FIG. 1 is an example representation of virtual content superimposed on a real-world environment according to one or more embodiments.

FIG. 1 illustrates an example representation of virtual content superimposed on a real-world environment 106 by an AR system, in accordance with certain embodiments of the present disclosure. As shown in FIG. 1, the representation may be embodied in a display device 100 of a user device (not otherwise shown), such as a smartphone, table computer, camera, or headset, comprising or in communication with an image device (e.g., a digital camera) that is configured to receive image data of the real-world environment 106. The images of the real-world environment 106 may be shown in real-time or near real-time on the display device 100.

The real-world environment 106 may comprise one or more objects in an internal or external scene. The example real-world environment 106 of FIG. 1 comprises an interior scene inside a structure (e.g., a room in a building), the scene including one or more walls, a ceiling, and a plurality of objects.

Further, the display device 100 may be used to show virtual content of an AR application, such as one or more AR graphics, text, objects, and/or other AR information superimposed on the one or more displayed images of the real-world environment 106. In the example representation of FIG. 1, the display device 100 is being used to present AR content including a plurality of virtual sprinklers 102a, 102b, 102c attached to the ceiling of the real-world environment 106. The display device 100 also is being used to show AR content representing sprinkler pipes 104a, 104b for the sprinklers 102a, 102b, 102c.

According to some embodiments, an AR application may be configured to allow a user to add, remove, and/or modify various types of virtual objects to the display of the real-world environment 106. In this way, a user can simulate different types of, locations for, and/or distances between virtual objects. For example, a user may be presented (e.g., via the display device 100) with an interface enabling her to add, remove, and/or reconfigure one or more of virtual sprinklers 102a, 102b, 102c and/or other types of objects (e.g., security video cameras, motion sensors, fire extinguishers, exit and emergency signs, etc.).

According to one embodiment, in order to simulate how new and/or modified objects would appear and/or function in a real-world environment, an AR application may be configured to allow a user to view a location through the display device 100 of a user device (e.g., by adjusting the camera view of a smartphone or mixed reality headset). The AR application may, for example, recognize one or more surfaces in the current view with which the user may interact in the AR environment by adding virtual objects and/or simulating events using AR content.

According to some embodiments, a user may use a pointer device, touch screen, microphone, or other input device to identify a location at which to add a virtual object (e.g., a sprinkler) in the AR environment. The AR application will apply the virtual object at the indicated location. An interface of the AR application may allow a user to select a type of virtual object using a pointer device, touch screen, microphone (e.g., for voice commands), keyboard, or other input device. For example, a user viewing the real-world environment 106 may select a menu item for adding virtual sprinklers at locations on the displayed ceiling of the room where the user touches a touch screen, or at a location identified in a headset interface. In one example, an AR application may be configured to receive voice commands, such as a spoken command from a user to "add sprinkler." In another example, the user may initiate a function of an AR application for adding one or more virtual objects to an AR environment displayed on a display device, such as by tapping a displayed interface, or pressing a soft or hard button of a user device.

According to some embodiments, an AR application may allow a user to select one or more real-world and/or virtual objects using one or more types of input devices. For example, the user may select one or more objects displayed on the display device 100 and recognized by the AR application, using voice commands via a microphone, actuating a menu item, and/or selecting a visible object via a touch screen of the display device 100.

According to one embodiment, the AR application may provide an interface for managing various types of objects in an AR environment and information associated with the objects.

The AR application may further be configured to receive from the user a request to show and/or determine information about one or more objects in the currently displayed view, room, structure, or location. According to some embodiments, a user may say "identify objects" or "review space" to determine unique identifiers, object types, positions, and/or other information associated with one or more objects in an AR environment (including real-world and/or virtual objects). In one example, a user may say "identify sprinkler" to determine a unique identifier, a sprinkler type, and/or a position of a virtual sprinkler. In another example, a user may select a displayed object using the interface and select a menu item corresponding to a request for information about the object.

According to some embodiments, an AR application may be configured to determine distances and other measurements related to real-world objects (e.g., the length and width of a physical table), related to virtual objects (e.g., a distance between simulated objects), and/or related to at least one physical object and at least one virtual object (e.g., a distance between a virtual sprinkler placed by a user in an AR environment and a physical wall). In one embodiment, the AR application may be configured to automatically identify distances between any recognized objects; alternatively, or in addition, a user may be allowed to select an object or multiple objects for which measurements are to be taken. Some examples of distance measuring functionality suitable for desired implementations of AR applications include that available in the Measure application by Google, Inc. for the Android 7.0 operating system or later and the Measure application by Apple, Inc. for the iOS 12 operating system.

Figure 2:
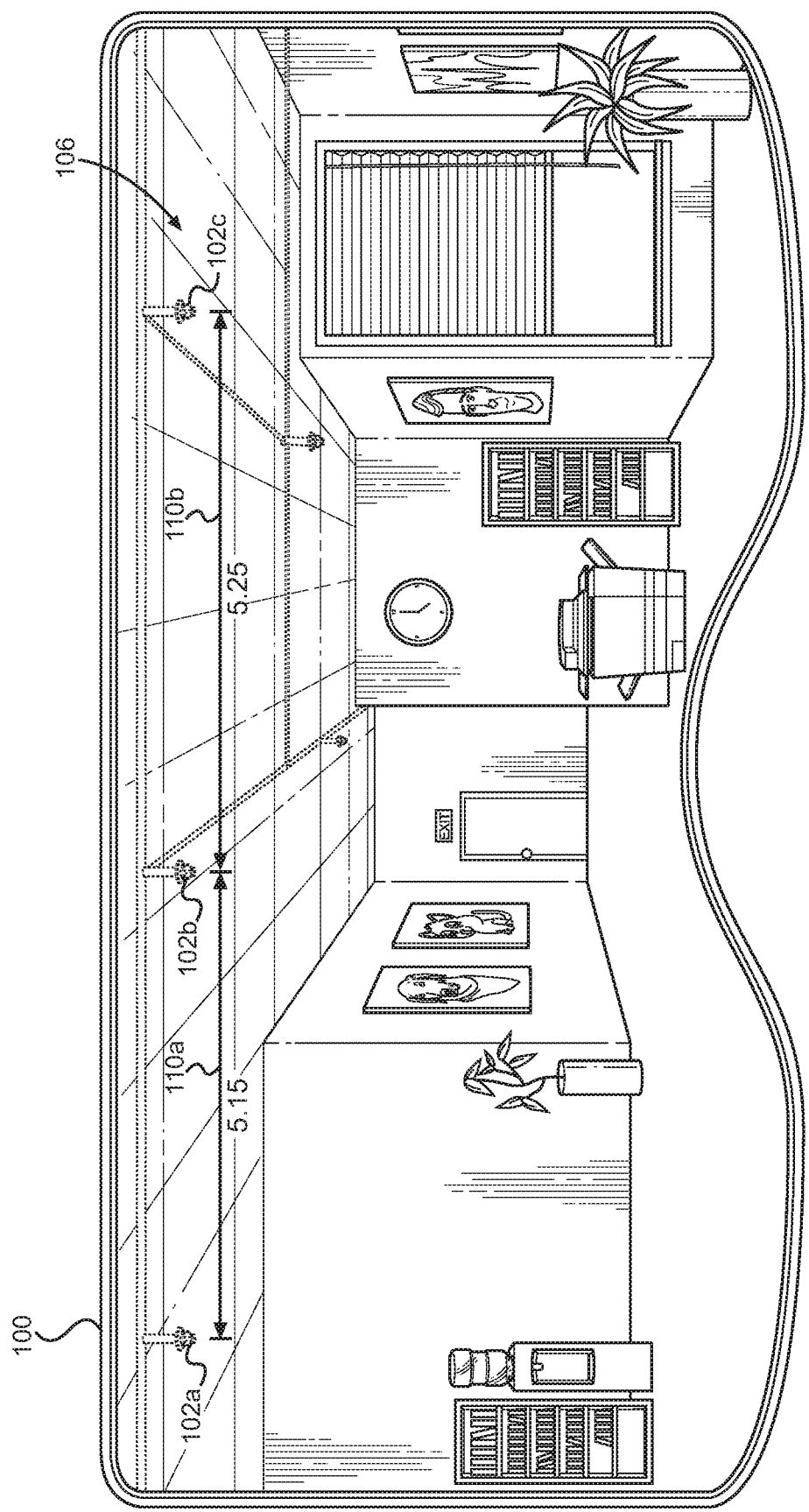
FIG. 2 is an example representation of virtual content superimposed on a real-world environment according to one or more embodiments.

FIG. 2 illustrates an example representation of virtual content that includes indications of measurement information superimposed on a real-world environment 106 by an AR system, in accordance with certain embodiments of the present disclosure. As shown in FIG. 2, the representation of the AR environment may be embodied in a display device 100 of a user device (not otherwise shown) and may be used to show representations of measurement lines and text indicating measurement values superimposed on the real-world environment 106. In the example representation of FIG. 2, the display device 100 is being used to present AR measurement line 110a between virtual sprinklers 102a and 102b and measurement line 110b between virtual sprinklers 102b and 102c. In one example, a user may say "calculate distance" or otherwise provide an instruction to the AR application to calculate a distance between two or more virtual and/or real-world objects (e.g., sprinklers). In response to receiving the instruction, the AR application may direct a processor of a user device to draw in an AR environment a line segment between objects (e.g., sprinklers) and display an indication of a calculated distance between them.

According to some embodiments, a user may be able to move virtual objects in an AR environment via an AR interface (e.g., using a pointing device, touch screen, and/or voice commands) and the AR application will dynamically readjust associated AR content, including measurement lines, measurement values, location information, etc.

According to some embodiments, an AR application may be configured to simulate behavior based on virtual and/or real-world objects. In one or more embodiments, instructions of an AR application may be configured to simulate actions and events associated with one or more types of objects.

Figure 3:
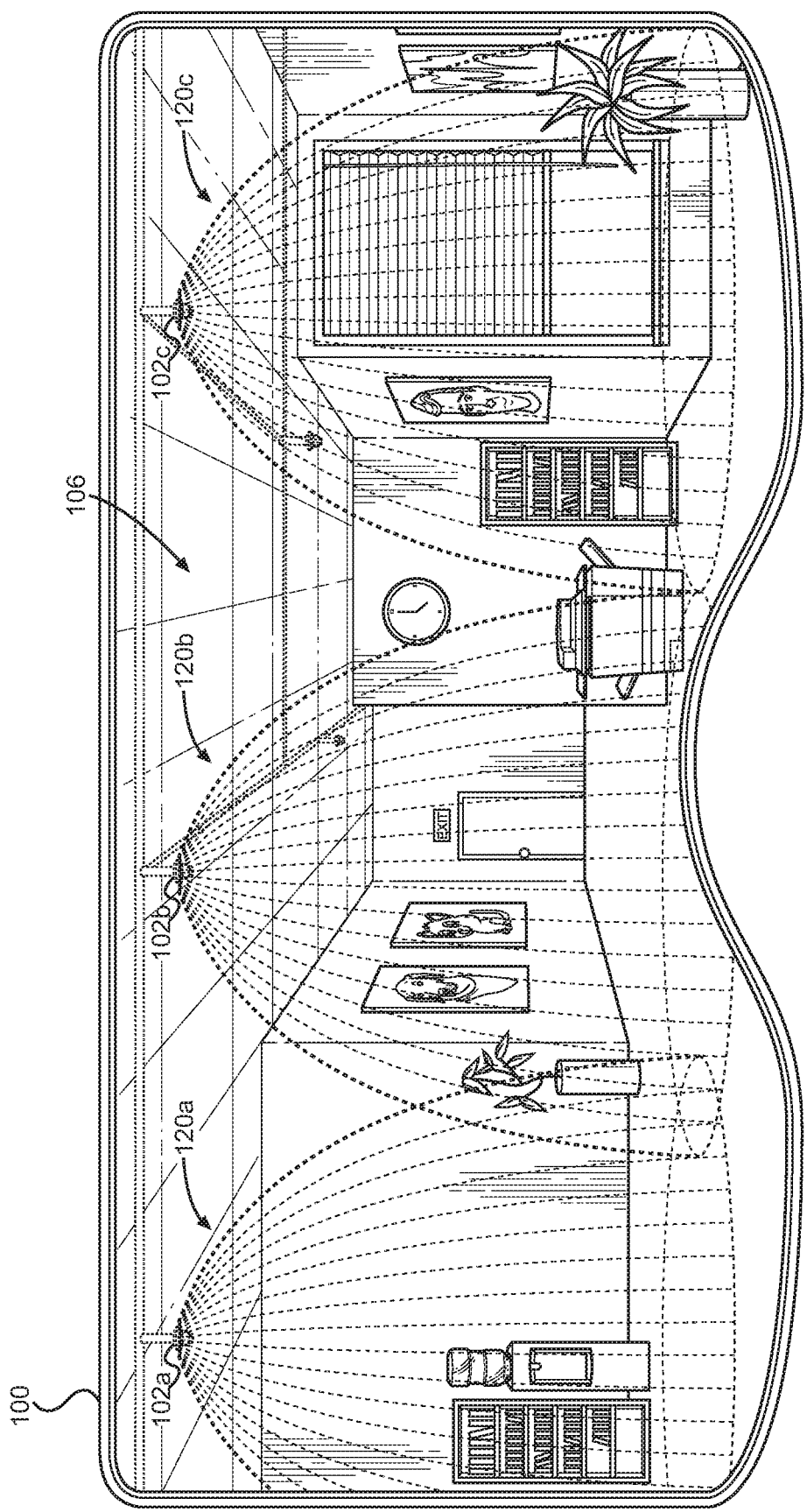
FIG. 3 is an example representation of virtual content superimposed on a real-world environment according to one or more embodiments.

FIG. 3 illustrates an example representation of virtual content that includes indications of virtual event information superimposed on a real-world environment 106 by an AR system, in accordance with certain embodiments of the present disclosure. As shown in FIG. 3, the representation of the AR environment may be embodied in a display device 100 of a user device (not otherwise shown) and may be used to show representations of event and/or spatial information. Virtual event and/or spatial information may indicate actions, interactions, and other types of simulated behavior of objects superimposed on the real-world environment 106.

In the example representation of FIG. 3, the display device 100 is being used to provide event information 120a, 120b, 120c, which in the depicted example comprises virtual object information representative of water sprinkling from virtual sprinklers 102a, 102b, 102c. The event information 120a, 120b, 120c thus comprises object information superimposed on the real-world environment 106 to simulate the size, shape, and volume of sprinkler patterns associated with the virtual sprinklers 102a, 102b, 102c.

According to one or more embodiments, a user may say "activate [object]" (where the indicated "[object]" is an object or object type represented in an AR environment) or otherwise provide an instruction to the AR application to initiate the presentation of virtual content associated with events and/or behavior of objects. In one example, a user may say "switch on sprinkler" to request the presentation of AR animation of sprinklers viewable in an AR environment (as virtual and/or real-world sprinklers), to simulate the physical effect of the sprinklers being activated. In another example, a user may say "switch off sprinkler" to remove virtual content representative of active sprinklers from the AR environment.

According to some embodiments, an AR system may comprise various types of structure information, including but not limited to sensor information and structural element information. According to one embodiment, an AR system may comprise one or more sensors for detecting information about a structure, and the AR system may be configured (e.g., with an AR application) to present sensor information as virtual content in an AR environment. In some embodiments, sensors of an AR system may comprise one or more infrared sensors, heat sensors, ambient noise sensors, ambient light sensors, electromagnetic radiation sensors, humidity sensors, and the like. In one or more embodiments, a sensor may be integrated with a user device and/or with a display device (e.g., for displaying AR content); in other embodiments, one or more sensors may be in communication with a user device (e.g., wirelessly or via a wired connection) for providing sensor information to the user device.

According to some embodiments, an AR system may comprise structure information for a structure that comprises information about physical, real-world structural elements. According to one embodiment, information about structural elements may comprise architectural blueprints, construction plans, security system plans, electrical plans, plumbing plans, information technology (IT) networking and other types of IT infrastructure plans, etc.

In some embodiments, an AR system may comprise one or more data stores for storing one or more types of structure information (e.g., sensor information and/or structural element information) in association with a structure and/or location. In one embodiment, an AR application may access stored information over a network using one or more web services, such as NodeJs and/or MongoDB. Structure information may comprise, for example, counts of numbers of various types of objects (e.g., fire extinguishers, CCTV cameras, etc.), average distances between objects (e.g., coverage configuration of emergency sprinklers), and/or a score or other relative indication of a safety and/or security assessment for a structure. In one example, a safety score may be based at least in part on a number of one or more specific types of objects (e.g., sprinklers, fire extinguishers), and a simulated score may be adjusted based on a user's addition, removal, configuration, and/or manipulation of virtual objects in an AR environment. For instance, an initial safety score for a particular office location with two real-world sprinklers may be improved using an AR application to place an additional (virtual) sprinkler to simulate the addition of another real-world sprinkler that improves water coverage in case of a fire.

Figure 4:
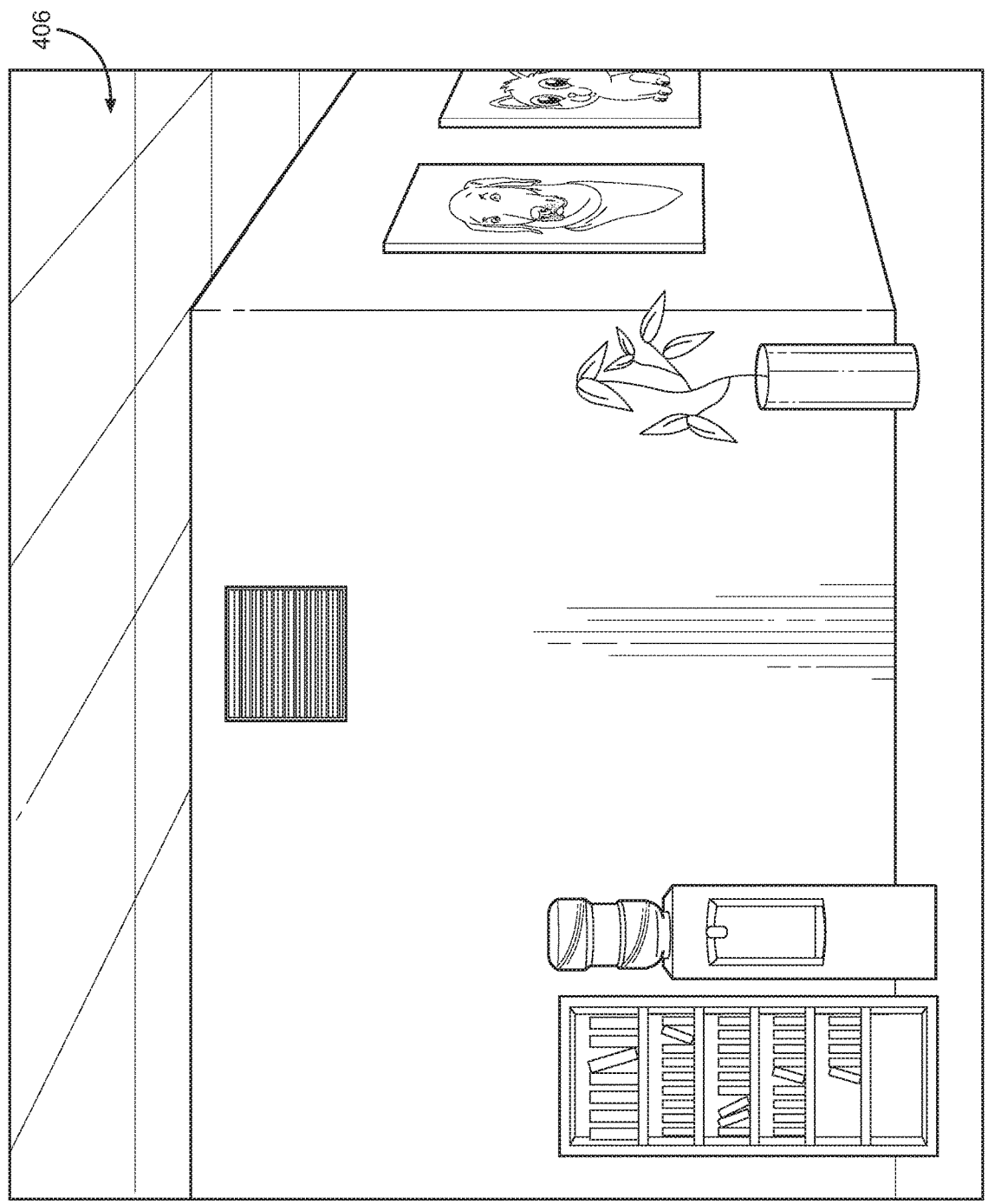
FIG. 4 is an example representation of a real-world environment according to one or more embodiments.
Figure 5:
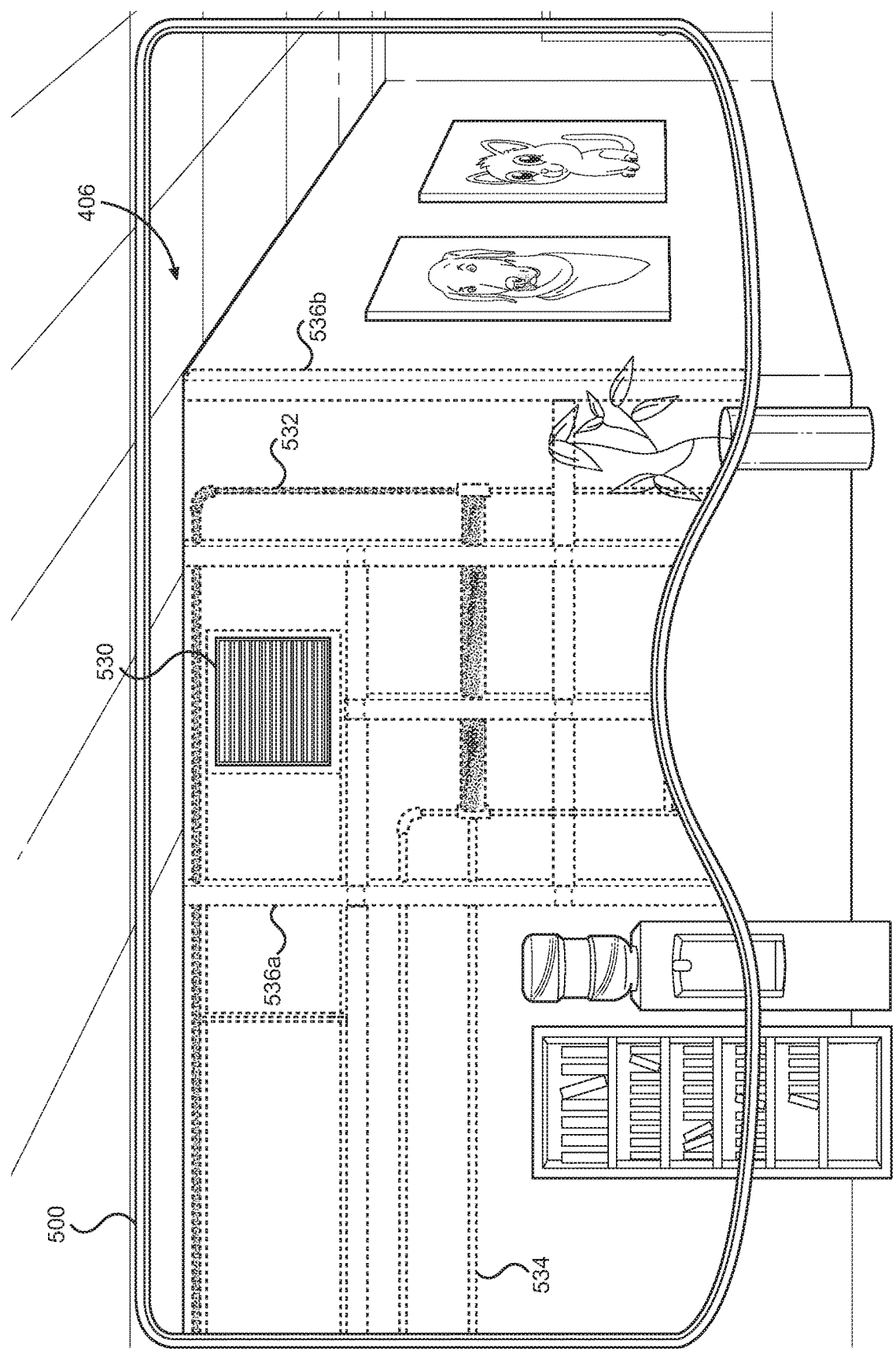
FIG. 5 is an example representation of virtual content superimposed on a real-world environment according to one or more embodiments.

FIG. 4 illustrates an example representation of a real-world environment 406, such as an interior view of an office. FIG. 5 illustrates an example representation of virtual content that includes indications of virtual structure information superimposed on the example real-world environment 406 (depicted in FIG. 4) by an AR system, in accordance with certain embodiments of the present disclosure. As shown in FIG. 5, the representation of the AR environment may be embodied in a display device 500 of a user device (not otherwise shown) and may be used to show representations of sensor and/or structural element information. In the example representation of FIG. 5, the display device 500 is being used to show all the real-world information also depicted in FIG. 4, including a displayed real-world vent 530, and to provide AR content representing structural element information, including representations of wall studs 536a, 536b and plumbing 532, 534, that is in the depicted wall and is not visible in the real-world environment 406.

In addition, the example representation in FIG. 5 provides examples of sensor information derived from one or more heat sensors. Specifically, the example AR content showing plumbing element 532 is presented as highlighted to indicate a particular heat signature (e.g., for hot water) that is different from how plumbing element 534 is presented (e.g., for cold water).

Figure 6:
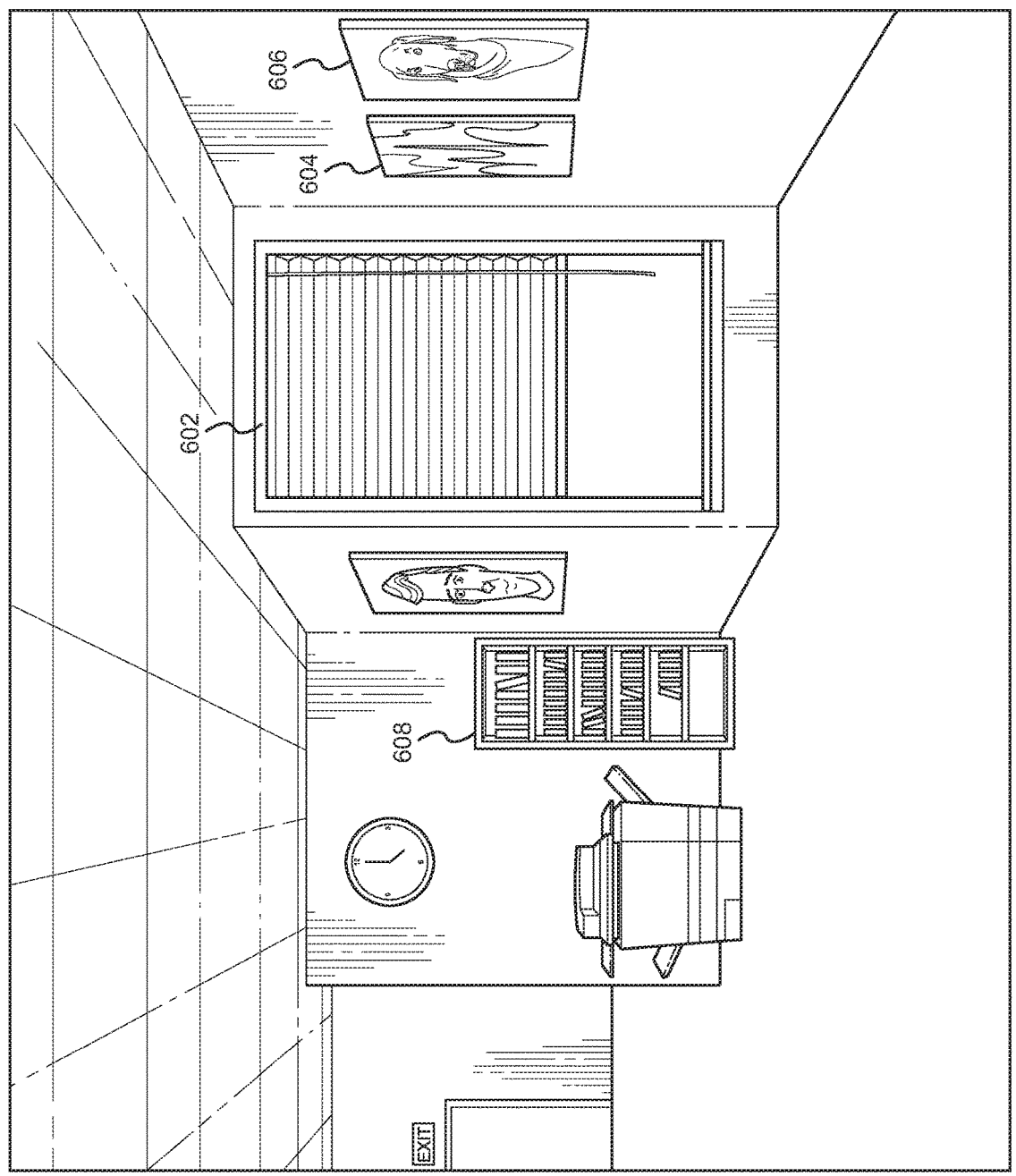
FIG. 6 is an example representation of a real-world environment at a location according to one or more embodiments.
Figure 7:
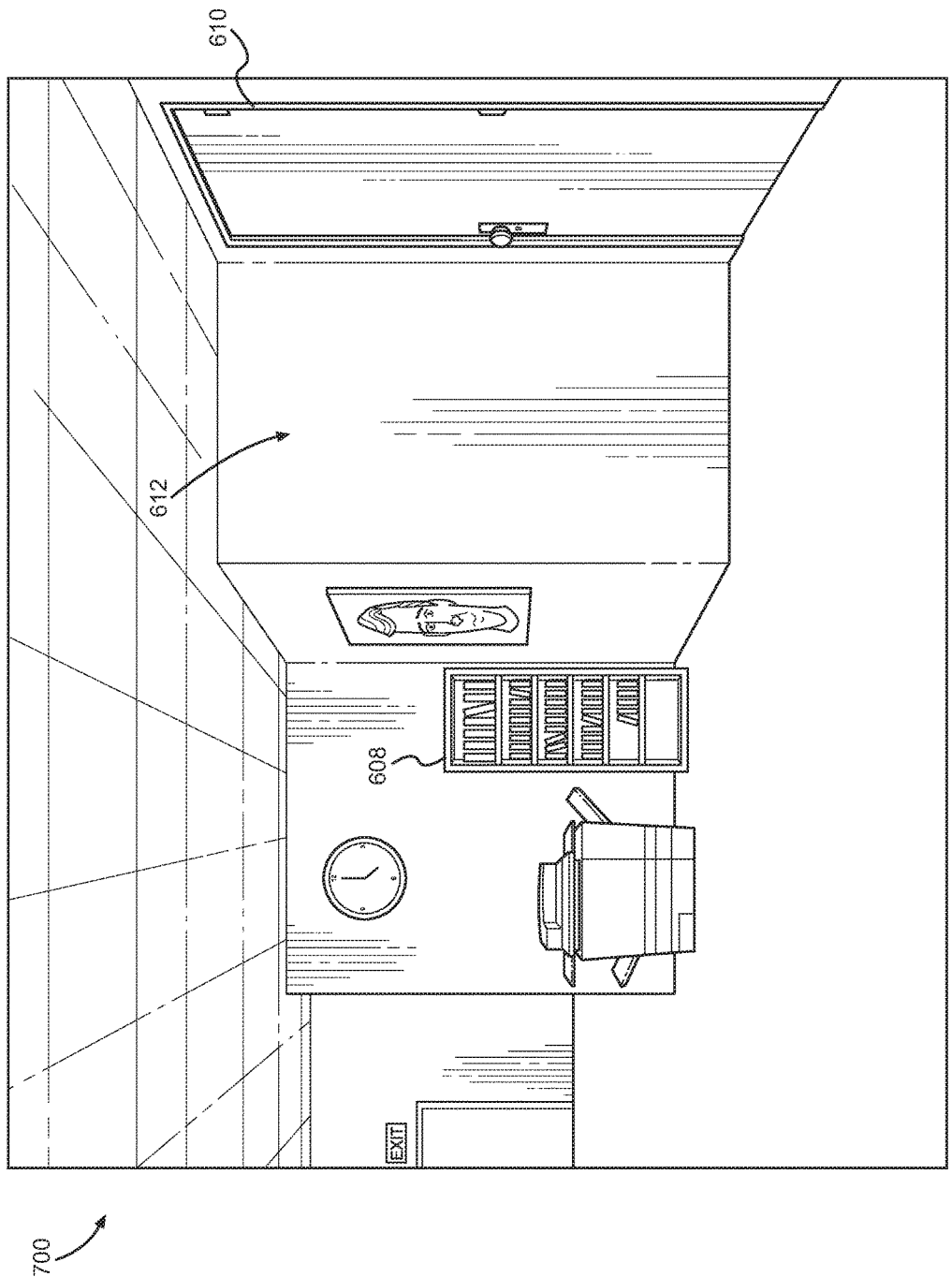
FIG. 7 is an example representation of a real-world environment at the location according to one or more embodiments.

According to some embodiments, an AR system may be configured to store, retrieve, and display historical information about a structure or location as AR content superimposed over displayed real-world image data. FIG. 6 illustrates an example representation of image data 600 recorded of a location at a first time. The real-world image data 600 includes several real-world objects, including a window 602, artwork 604, 606, and a bookshelf 608. In one embodiment, the image data 600 may be stored in an AR system and used for generating AR content. FIG. 7 illustrates an example representation of image data 700 for the same location of FIG. 6 but as of a different time. The real-world image data 700 (which may be indicative of a current view using an integrated camera of a smartphone or mixed reality headset) includes several real-world objects, including a wall 612 (in which the window 602 was visible in image data 600), a door 610 (not shown in image data 600), and the bookshelf 608 (also depicted in image data 600). In some embodiments, the image data 600 and/or the image 700 may be stored in an AR system and used for generating AR content (e.g., as historical information presented in an AR environment).

Figure 8:
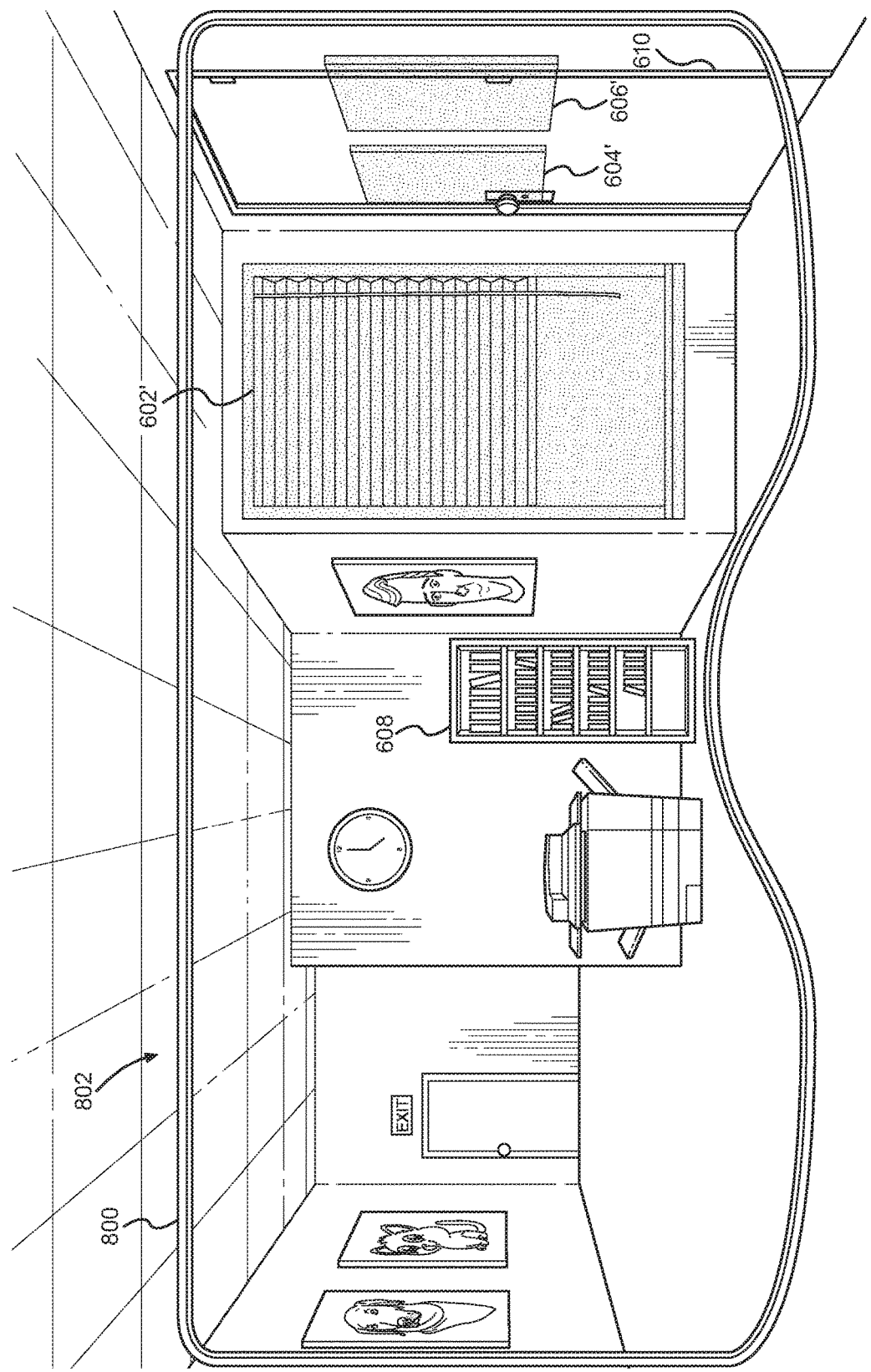
FIG. 8 is an example representation of virtual content superimposed on a real-world environment at the location according to one or more embodiments.

FIG. 8 illustrates an example representation of virtual content that includes indications of historical information about a location superimposed on a real-world environment 802 by an AR system, in accordance with certain embodiments of the present disclosure. As shown in FIG. 8, the representation of the AR environment may be embodied in a display device 800 of a user device (not otherwise shown) and may be used to show representations of historical information for a location. The AR content may be generated, for example, based on the image data 600 and shown superimposed over image data 700 (which is indicative of real-world environment 802).

The bookshelf 608 is constant in both image data 600 and image data 700 and in this example appears without AR content as part of the real-world environment 802. In one embodiment, objects that have not changed over time for a location may be highlighted or have AR content superimposed on the AR interface to indicate the object was present in the older image data. In one embodiment, real-world objects that are currently present but were not present previously may be highlighted or have AR content superimposed on the AR interface to indicate the object was not present in the older image data.

As shown in FIG. 8, the window 602 is represented using virtual content as a virtual window 602' to indicate that the original window 602 was but is no longer present in that wall of the location. Similarly, virtual artwork 604', 606' are AR content superimposed over the image of current real-world door 610 to indicate where the artwork 604, 606 was previously (e.g., according to the historical image data 600).

Figure 9:
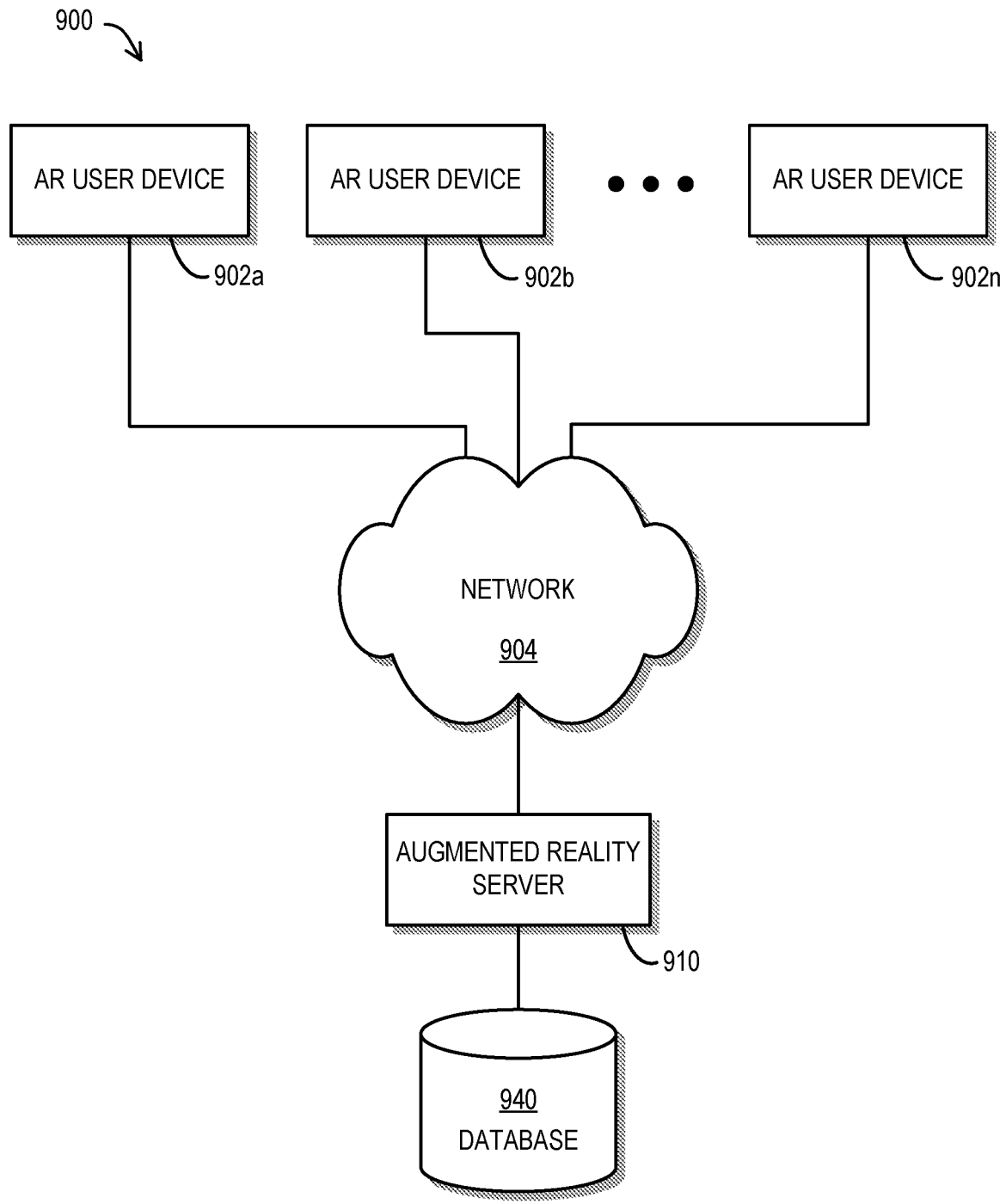
FIG. 9 is a diagram of a system according to one or more embodiments.

Referring now to FIG. 9, a block diagram of a system 900 according to some embodiments is shown. In some embodiments, the system 900 may comprise a plurality of AR user devices 902a-n in communication with and/or via a network 904. In some embodiments, an augmented reality server 910 may be in communication with the network 904 and/or one or more of the AR user devices 902a-n. In some embodiments, the augmented reality server 910 (and/or the AR user devices 902a-n) may be in communication with a database 940. The database 940 may store, for example, data associated with customers and/or one or more claims related to customers (e.g., insurance customers) owning and/or operating the AR user devices 902a-n, and/or instructions that cause various devices (e.g., the augmented reality server 910 and/or the AR user devices 902a-n) to operate in accordance with embodiments described in this disclosure.

The AR user devices 902a-n, in some embodiments, may comprise any type or configuration of electronic, mobile electronic, and or other network and/or communication devices (or combinations thereof) that are or become known or practicable. The first user device 902a may, for example, comprise one or more: PC devices; computer workstations; mixed reality and augmented reality system input devices and/or mixed reality and augmented reality system output devices, such as the Mixed Reality Headset by Acer, the Visor by Dell, the Explorer by Lenovo, the Odyssey by Samsung, HoloLens™ by Microsoft Corporation, or the Lightwear by Magic Leap; tablet computers, such as an iPad® manufactured by Apple®, Inc. of Cupertino, Calif.; and/or cellular and/or wireless telephones, such as a Galaxy S9™ by Samsung Electronics, an iPhone® (also manufactured by Apple®, Inc.), or a G7 ThinQ™ smart phone manufactured by LG® Electronics, Inc. of San Diego, Calif., and running the Android® operating system from Google®, Inc. of Mountain View, Calif. In some embodiments, one or more of the AR user devices 902a-n may be specifically utilized and/or configured (e.g., via specially-programmed and/or stored instructions, such as may define or comprise a software application) to communicate with the augmented reality server 910 (e.g., via the network 904).

The network 904 may, according to some embodiments, comprise LAN, WAN, cellular telephone network, Bluetooth® network, NFC network, and/or RF network with communication links between the AR user devices 902a-n, the augmented reality server 910, and/or the database 940. In some embodiments, the network 904 may comprise direct communications links between any or all of the components 902a-n, 910, 940 of the system 900. The augmented reality server 910 may, for example, be directly interfaced or connected to the database 940 via one or more wires, cables, wireless links, and/or other network components, such network components (e.g., communication links) comprising portions of the network 904. In some embodiments, the network 904 may comprise one or many other links or network components other than those depicted in FIG. 9. The second user device 902b may, for example, be connected to the augmented reality server 910 via various cell towers, routers, repeaters, ports, switches, and/or other network components that comprise the Internet and/or a cellular telephone (and/or Public Switched Telephone Network (PSTN)) network, and which comprise portions of the network 904.

While the network 904 is depicted in FIG. 9 as a single object, the network 904 may comprise any number, type, and/or configuration of networks that is or becomes known or practicable. According to some embodiments, the network 904 may comprise a conglomeration of different sub-networks and/or network components interconnected, directly or indirectly, by the components 902a-n, 910, 940 of the system 900. The network 904 may comprise one or more cellular telephone networks with communication links between the AR user devices 902a-n and the augmented reality server 910, for example, and/or may comprise the Internet, with communication links between the AR user devices 902a-n and the database 940, for example.

According to some embodiments, the augmented reality server 910 may comprise a device (or system) owned and/or operated by or on behalf of or for the benefit of a company. The company may utilize structure information, customer information, safety information, and/or virtual information (e.g., virtual objects for simulating environments) in some embodiments, to manage, generate, analyze, select, and/or otherwise determine information for use in rendering customized AR experiences for employees and customers.

In some embodiments, a company (and/or a third-party, not explicitly shown) may provide an AR interface (not shown in FIG. 9) to and/or via the AR user devices 902a-n. The interface may be configured, according to some embodiments, to allow and/or facilitate access to customized AR programs, modules, and/or experiences, by one or more customers, employees, and/or other types of users. In some embodiments, the system 900 (and/or the augmented reality server 910) may present customized AR environments and/or scenarios based on customer information (e.g., from the database 940), safety data, geospatial data, sensor data, structure data, and/or telematics data.

In some embodiments, the database 940 may comprise any type, configuration, and/or quantity of data storage devices that are or become known or practicable. The database 940 may, for example, comprise an array of optical and/or solid-state hard drives configured to store data and/or various operating instructions, drivers, etc. While the database 940 is depicted as a stand-alone component of the system 900 in FIG. 9, the database 940 may comprise multiple components. In some embodiments, a multi-component database 940 may be distributed across various devices and/or may comprise remotely dispersed components. Any or all of the AR user devices 902a-n may comprise the database 940 or a portion thereof, for example, and/or the augmented reality server 910 may comprise the database 940 or a portion thereof.

Figure 10:
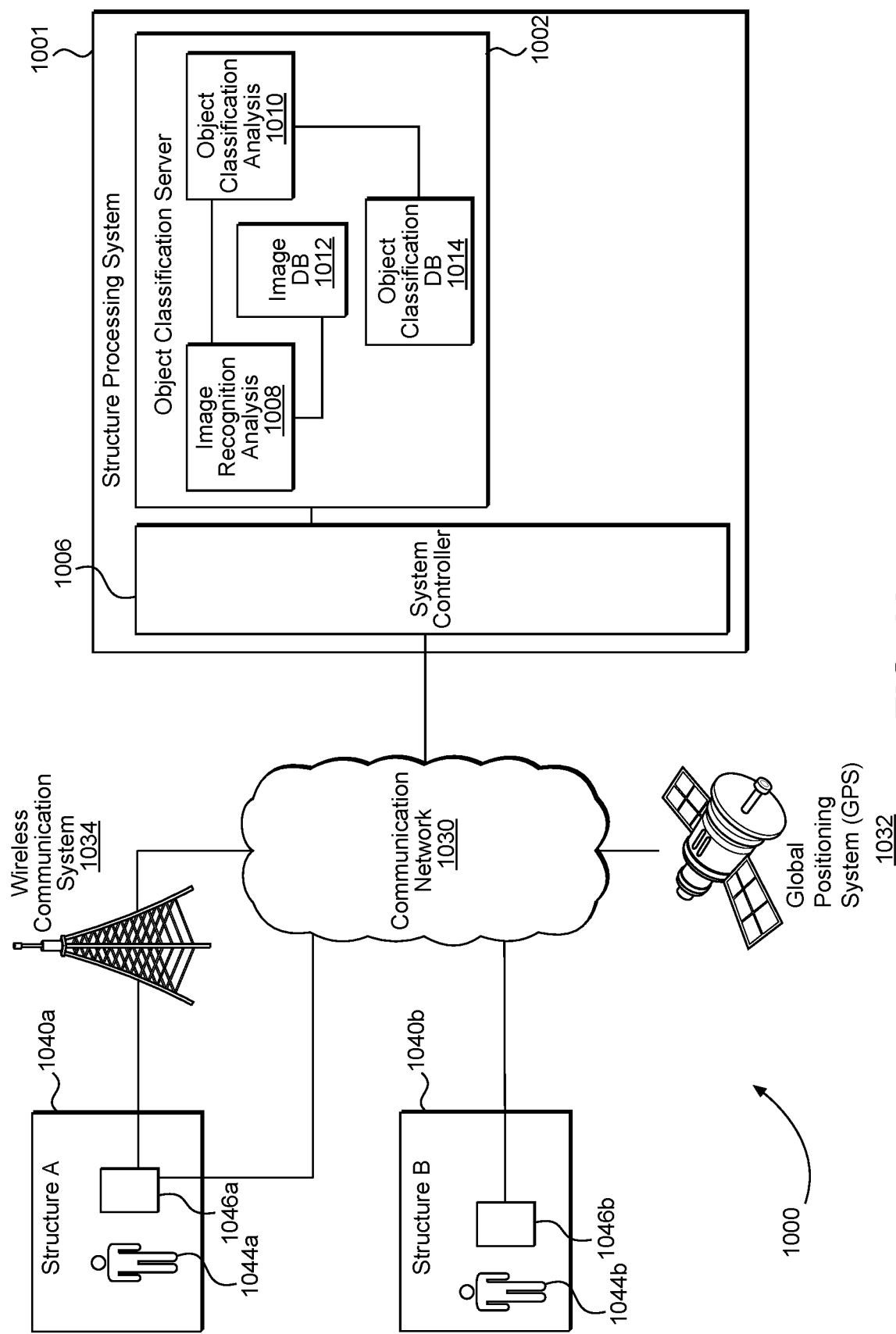
FIG. 10 is a diagram of a system according to one or more embodiments.

FIG. 10 is a diagram illustrating one or more embodiments of the present disclosure. More specifically, FIG. 10 shows an example AR system 1000 for providing AR content related to various structures. Specifically, the AR system 1000 may provide for determining information about a particular location, structure, or property, including geographical information associated with a structure and information (e.g., images) describing objects of the structure; and/or utilizing the structure and/or sensor information.

As shown in FIG. 10, the AR system 1000 may comprise a first structure (Structure A) 1040a and a second structure (Structure B) 1040b. As depicted in FIG. 10, a respective user 1044a, 1044b is present at each structure location with a respective mobile AR device 1046a, 1046b. Each of the mobile AR devices 1046a, 1046b is in communication with a structure processing system 1001, which comprises an object classification server 1002 and a system controller 1006.

Any two or more of the various devices depicted in AR system 1000 may be in communication with each other via at least one of communication network 1030 and wireless communication system 1034. As also depicted in FIG. 10, GPS 1032 may provide geographical location information to the mobile AR devices 1046a, 1046b, wireless communication system 1034, and/or one or more portions of structure processing system 1001. As described with respect to various embodiments, structure information and/or image data may be used for generating AR content (e.g., captured in digital images) for display at one or more of the mobile AR devices 1046a, 1046b.

As shown in FIG. 10, the object classification server 1002 may comprise image recognition analysis instructions 1008 for conducting an image recognition analysis of images, image DB 1012 (e.g., containing stored object image data for comparing with images received from mobile AR devices 1046a, 1046b), object classification analysis instructions 1010, and object classification DB 1014. Object classification analysis instructions 1010 may store instructions for classifying and/or determining classification information (e.g., object type information, object characteristic information) for one or more objects, based on the object classification DB 1014 (e.g., containing stored historical object classification data for a plurality of previously identified objects).

Figure 11:
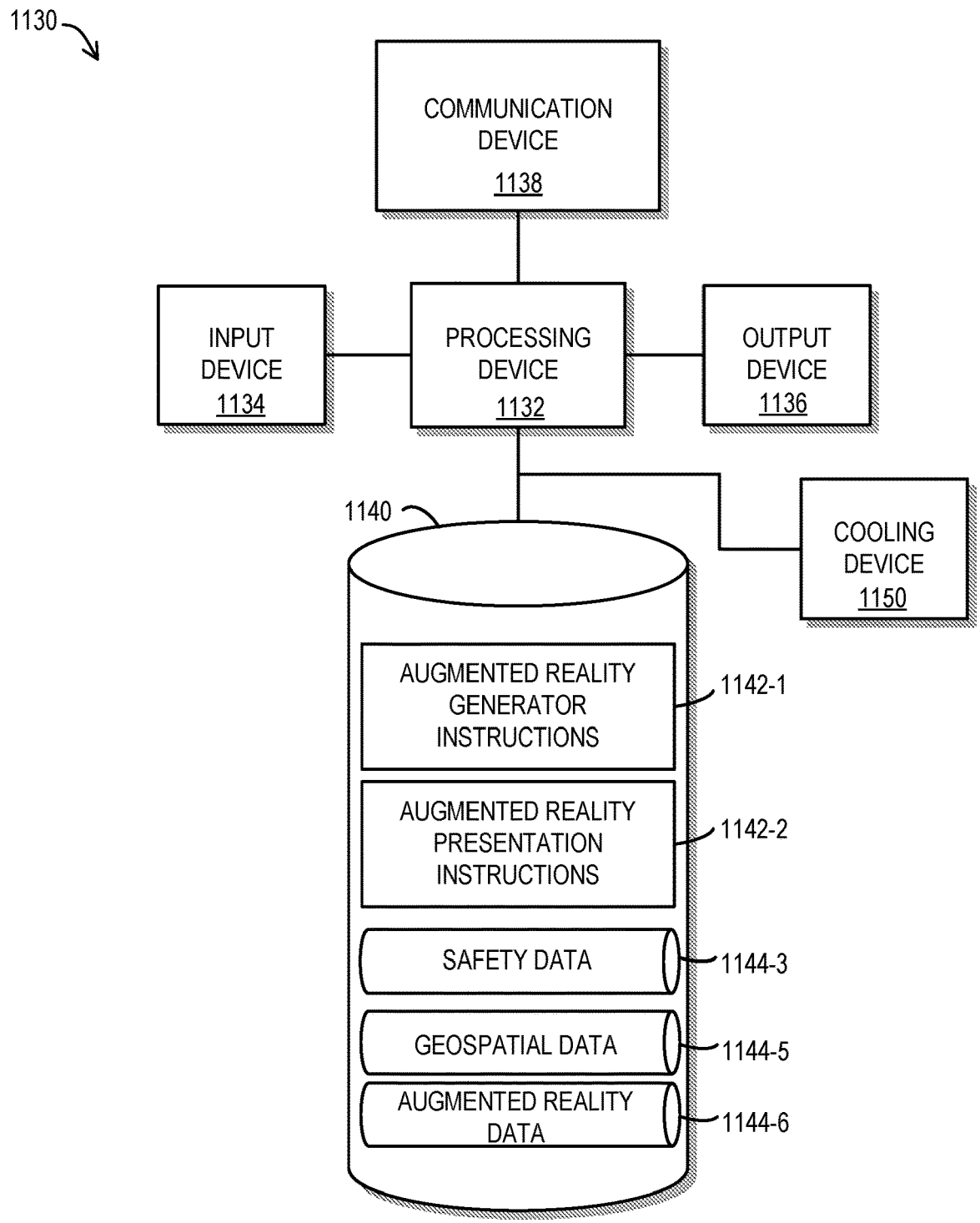
FIG. 11 is a block diagram of an apparatus according to one or more embodiments.

Turning to FIG. 11, a block diagram of an apparatus 1130 according to some embodiments is shown. In some embodiments, the apparatus 1130 may be similar in configuration and/or functionality to any of the AR user devices 102a-n and/or the augmented reality server 110 of FIG. 9 and/or may comprise a portion of the AR system 1000 of FIG. 10 herein. The apparatus 1130 may, for example, execute, process, facilitate, and/or otherwise be associated with methods described in this disclosure. In some embodiments, the apparatus 1130 may comprise a processing device 1132, an input device 1134, an output device 1136, a communication device 1138, and/or a memory device 1140. According to some embodiments, any or all of the components 1132, 1134, 1136, 1138, 1140 of the apparatus 1130 may be similar in configuration and/or functionality to any similarly named and/or numbered components described herein. Fewer or more components 1132, 1134, 1136, 1138, 1140 and/or various configurations of the components 1132, 1134, 1136, 1138, 1140 may be included in the apparatus 1130 without deviating from the scope of embodiments described herein.

According to some embodiments, the processing device 1132 may be or include any type, quantity, and/or configuration of electronic and/or computerized processor that is or becomes known. The processing device 1132 may comprise, for example, an Intel® IXP 2800 network processor or an Intel® XEON™ Processor coupled with an Intel® E7501 chipset. In some embodiments, the processing device 1132 may comprise multiple inter-connected processors, microprocessors, and/or micro-engines. According to some embodiments, the processing device 1132 (and/or the apparatus 1130 and/or portions thereof) may be supplied power via a power supply (not shown), such as a battery, an Alternating Current (AC) source, a Direct Current (DC) source, an AC/DC adapter, solar cells, and/or an inertial generator. In the case that the apparatus 1130 comprises a server, such as a blade server, necessary power may be supplied via a standard AC outlet, power strip, surge protector, and/or Uninterruptible Power Supply (UPS) device.

In some embodiments, the input device 1134 and/or the output device 1136 are communicatively coupled to the processing device 1132 (e.g., via wired and/or wireless connections and/or pathways) and they may generally comprise any types or configurations of input and output components and/or devices that are or become known, respectively. The input device 1134 may comprise, for example, a keyboard that allows an operator of the apparatus 1130 to interface with the apparatus 1130 (e.g., by a user of an AR application). In some embodiments, the input device 1134 may comprise a sensor configured to provide information to the apparatus 1130 and/or the processing device 1132. The output device 1136 may, according to some embodiments, comprise a display screen and/or other practicable output component and/or device. The output device 1136 may, for example, provide an AR module to a customer or other type of user (e.g., via a website or web service accessible using a user device). According to some embodiments, the input device 1134 and/or the output device 1136 may comprise and/or be embodied in a single device, such as a touch-screen monitor.

In some embodiments, the communication device 1138 may comprise any type or configuration of communication device that is or becomes known or practicable. The communication device 1138 may, for example, comprise a network interface card (NIC), a telephonic device, a cellular network device, a router, a hub, a modem, and/or a communications port or cable. In some embodiments, the communication device 1138 may be coupled to provide data to a user device and/or AR presentation system (not shown in FIG. 11. The communication device 1138 may, for example, comprise a cellular telephone network transmission device that sends signals to a user device. According to some embodiments, the communication device 1138 may also or alternatively be coupled to the processing device 1132. In some embodiments, the communication device 1138 may comprise an IR, RF, Bluetooth™, and/or Wi-Fi® network device coupled to facilitate communications between the processing device 1132 and another device (such as a customer device and/or a third-party device).

The memory device 1140 may comprise any appropriate information storage device, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM).

The memory device 1140 may, according to some embodiments, store one or more of augmented reality generator instructions 1142-1, augmented reality presentation instructions 1142-2, safety data 1144-3, geospatial data 1144-5, and/or augmented reality data 1144-6.

In some embodiments, the augmented reality generator instructions 1142-1 may be utilized by the processing device 1132 to generate virtual content, including virtual objects and simulated events, for presentation to users and output the generated virtual content via the output device 1136 and/or the communication device 1138.

According to some embodiments, the augmented reality generator instructions 1142-1 may be operable to cause the processing device 1132 to process safety data 1144-3, and/or geospatial data 1144-5 (e.g., to generate augmented reality data 1144-6). Alternatively or in addition, as described with respect to various embodiments in this disclosure, sensor data, historical image data, safety data, and/or structure data may be stored and/or accessed in generating AR presentations. Safety data 1144-3 and/or geospatial data 1144-5 received via the input device 1134 and/or the communication device 1138 may, for example, be analyzed, sorted, filtered, and/or otherwise processed by the processing device 1132 in accordance with the augmented reality generator instructions 1142-1. In some embodiments, safety data 1144-3 and/or geospatial data 1144-5 may be processed by the processing device 1132 using a virtual reality development application, engine, and/or software toolkit (e.g., Vizard VP Software Toolkit by WorldViz) in accordance with the augmented reality generator instructions 1142-1 to generate an AR environment (e.g., incorporating virtual content for superimposing over a displayed real-world environment) in accordance with one or more embodiments described in this disclosure.

In some embodiments, the augmented reality presentation instructions 1142-2 may be utilized by the processing device 1132 to present one or more AR presentations for users via one or more output devices. For example, the augmented reality presentation instructions 1142-2 may be embodied as a client application installed on a user device such as a personal computer, VR headset, smartphone, or dedicated AR computer terminal. Alternatively, or in addition, the augmented reality presentation instructions 1142-2 may be made available as a server-, network-, and/or web-based application executable via a client computer.

Any or all of the exemplary instructions and data types described in this disclosure and other practicable types of data may be stored in any number, type, and/or configuration of memory devices that is or becomes known. The memory device 1140 may, for example, comprise one or more data tables or files, databases, table spaces, registers, and/or other storage structures. In some embodiments, multiple databases and/or storage structures (and/or multiple memory devices 1140) may be utilized to store information associated with the apparatus 1130. According to some embodiments, the memory device 1140 may be incorporated into and/or otherwise coupled to the apparatus 1130 (e.g., as shown) or may simply be accessible to the apparatus 1130 (e.g., externally located and/or situated).

In some embodiments, the apparatus 1130 may comprise a cooling device 1150. According to some embodiments, the cooling device 1150 may be coupled (physically, thermally, and/or electrically) to the processing device 1132 and/or to the memory device 1140. The cooling device 1150 may, for example, comprise a fan, heat sink, heat pipe, radiator, cold plate, and/or other cooling component or device or combinations thereof, configured to remove heat from portions or components of the apparatus 1130.

Figure 12:
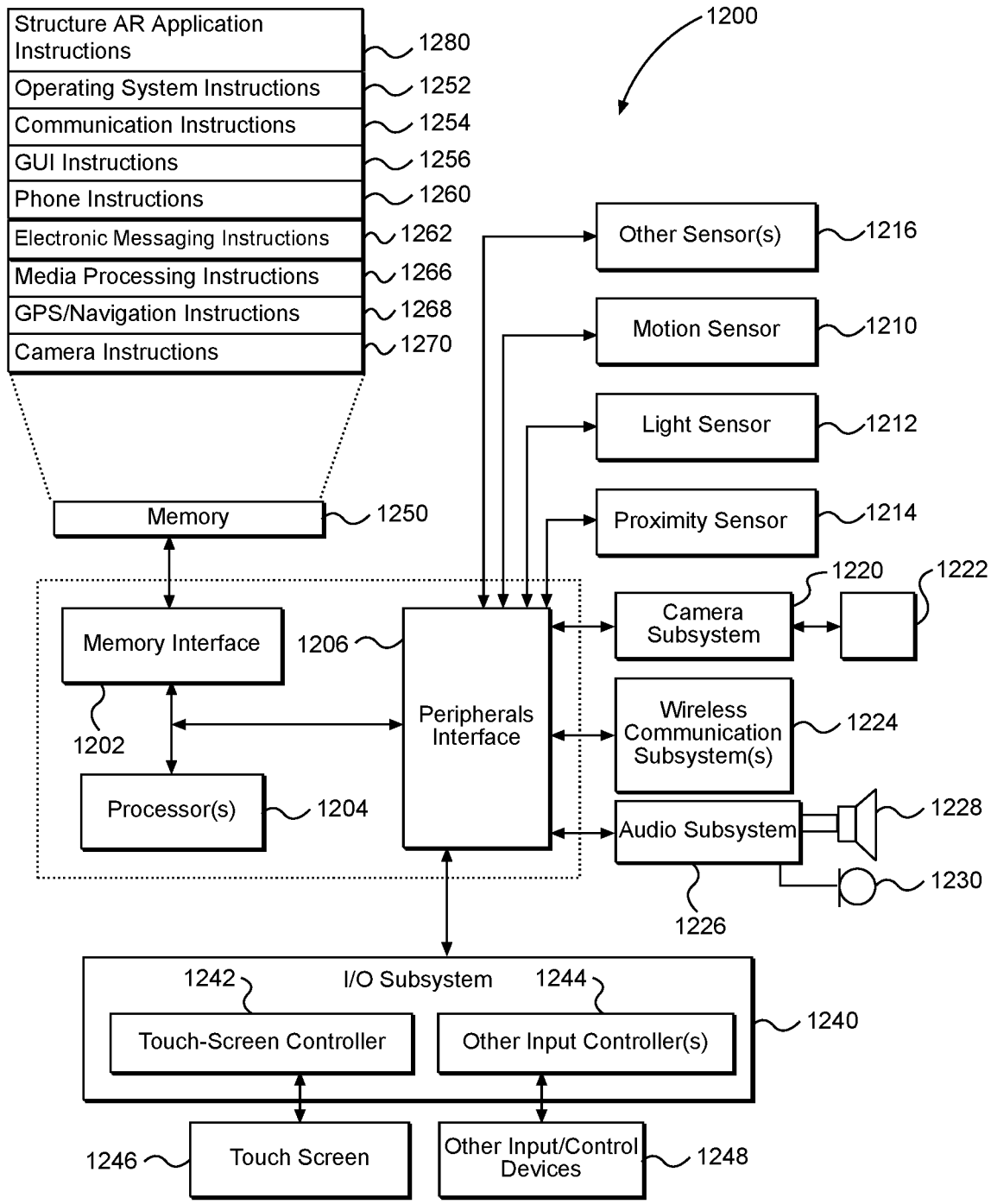
FIG. 12 is a block diagram of a device architecture according to one or more embodiments.

FIG. 12 is a block diagram of an example architecture 1200 for an AR user device, such as a mobile AR device. The AR user device may include a memory interface 1202, one or more data processors, image processors and/or central processing units 1204, and a peripherals interface 1206. The memory interface 1202, the one or more processors 1204, and/or the peripherals interface 1206 can be separate components or can be integrated in one or more integrated circuits. The various components in the AR user device can be coupled by one or more communication buses or signal lines.

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate the orientation, lighting, and proximity functions described with respect to FIG. 3. Other sensors 1216 can also be connected to the peripherals interface 1206, such as a positioning system (e.g., GPS receiver), a temperature sensor, an infrared sensor, an ambient light sensor, a biometric sensor, or other sensing device, to facilitate related functionalities.

A camera subsystem 1220 and an optical sensor 1222, e.g., a charged coupled device (CCD) or a complementary metal-oxide semiconductor (CMOS) optical sensor, can be utilized to facilitate camera functions, such as recording video and still image data.

Communication functions may be facilitated through one or more wireless communication subsystems 1224, which can include radio frequency receivers and transmitters and/or optical (e.g., infrared) receivers and transmitters. The specific design and embodiment of the communication subsystem 1224 can depend on the communication network(s) over which the AR user device is intended to operate. For example, an AR user device may include communication subsystems 1224 designed to operate over a GSM network, a GPRS network, an EDGE network, a Wi-Fi or WiMax network, and a Bluetooth™ network. The wireless communication subsystems 1224 may include hosting protocols such that the device 300 may be configured as a base station for other wireless devices.

An audio subsystem 1226 can be coupled to a speaker 1228 and a microphone 1230 to facilitate voice-enabled functions, such as voice recognition, voice replication, digital recording, and telephony functions.

The I/O subsystem 1240 can include a touch screen controller 1242 and/or other input controller(s) 1244. The touch-screen controller 1242 can be coupled to a touch screen 1246. The touch screen 1246 and touch screen controller 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1246.

As discussed in this disclosure, the AR user device may comprise a headset- or glasses-style display device and one or more associated motion controllers. Accordingly, the I/O subsystem 1240 may include a display screen configured to be worn in close proximity to the user's eyes, and may further comprise other input and/or input controllers for controlling functions of the wearable display device. Various types of mixed reality and augmented reality headsets are known to those skilled in the art.

The other input controller(s) 1244 can be coupled to other input/control devices 1248, such as one or more buttons, rocker switches, thumb-wheels, infrared ports, USB ports, and/or a pointer device, such as a stylus. The one or more buttons (not shown) can include an up/down button for volume control of the speaker 1228 and/or the microphone 1230.

In some embodiments, the AR user device can present recorded audio and/or video files, such as MP3, AAC, and MPEG files. In some embodiments, the AR user device can include the functionality of an MP3 player or other type of media player. Other input/output and control devices can also be used.

The memory interface 1202 can be coupled to memory 1250. The memory 1250 can include high-speed random-access memory and/or non-volatile memory, such as one or more magnetic disk storage devices, one or more optical storage devices, and/or flash memory (e.g., NAND, NOR). The memory 1250 can store an operating system 1252, such as Darwin, RTXC, LINUX, UNIX, OS X, WINDOWS, or an embedded operating system such as VxWorks. The operating system 1252 may include instructions for handling basic system services and for performing hardware dependent tasks. In some embodiments, the operating system instructions 1252 can be a kernel (e.g., UNIX kernel).

The memory 1250 may also store communication instructions 1254 to facilitate communicating with one or more additional devices, one or more computers and/or one or more servers.

The memory 1250 may include graphical user interface (GUI) instructions 1256 to facilitate graphic user interface processing; phone instructions 1260 to facilitate phone-related processes and functions; electronic messaging instructions 1262 to facilitate electronic-messaging related processes and functions; media processing instructions 1266 to facilitate media processing-related processes and functions; GPS/Navigation instructions 1268 to facilitate GPS and navigation-related processes and instructions; and/or camera instructions 1270 to facilitate camera-related processes and functions.

The memory 1250 may include structure AR application instructions 1280 to facilitate various embodiments described in this disclosure with respect to determining information about structures, including receiving and processing images, receiving and transmitting GPS information, receiving and transmitting object information about a real-world and/or AR environment, and the like.

Each of the above identified instructions and applications may correspond to a set of instructions for performing one or more functions described above. These instructions need not be implemented as separate software programs, procedures, or modules. The memory 1250 can include additional instructions or fewer instructions. Furthermore, various specialized functions of the AR user device, in accordance with embodiments described in this disclosure, may be implemented in hardware and/or in software, including in one or more signal processing and/or application-specific integrated circuits.

According to some embodiments, processes described in this disclosure may be performed and/or implemented by and/or otherwise associated with one or more specialized processing devices, specialized computers, specialized computer terminals, specialized computer servers, specialized computer systems, and/or specialized networks, and/or any combinations thereof. In some embodiments, methods may be embodied in, facilitated by, and/or otherwise associated with various input mechanisms and/or interfaces.

Any processes described in this disclosure do not necessarily imply a fixed order to any depicted actions, steps, and/or procedures, and embodiments may generally be performed in any order that is practicable unless otherwise and specifically noted. Any of the processes and/or methods described in this disclosure may be performed and/or facilitated by specialized hardware, software (including microcode), firmware, or any combination of such specialized components, as described in this disclosure. For example, a storage medium (e.g., a hard disk, a Universal Serial Bus (USB) mass storage device) may store instructions that when executed by a specialized machine or system described in this disclosure result in performance according to any one or more of the embodiments described in this disclosure.

Figure 13:
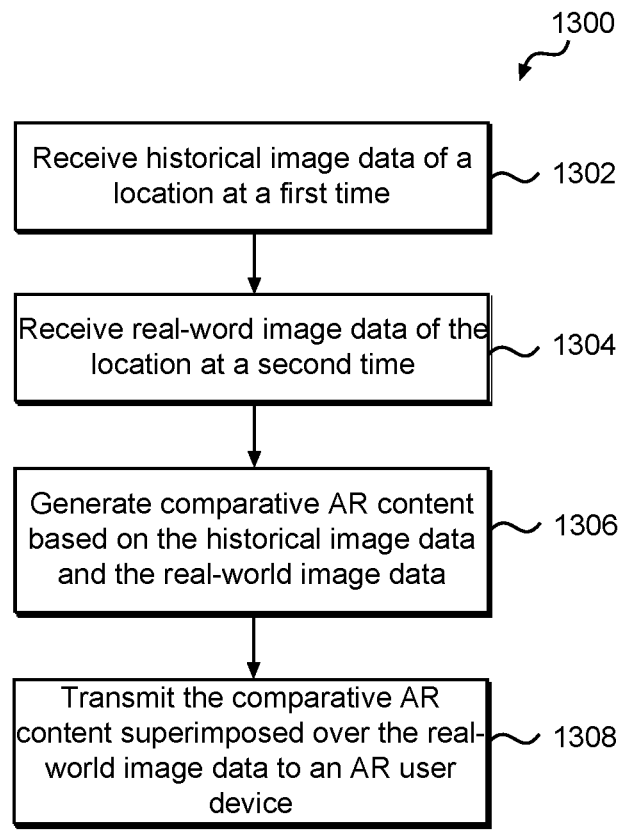
FIG. 13 is a flowchart of a method according to one or more embodiments.

Referring now to FIG. 13, a flow diagram of a method 1300 according to some embodiments is shown. The method 1300 may be performed, for example, by a specialized server computer or specialized computerized device (e.g., AR user devices 902*a-n*, mobile AR devices 1046*a*, 1046*b*, structure processing system 1001, and/or object classification server 1002). It should be noted that although some of the steps of method 1300 may be described as being performed by a server computer, for example, while other steps are described as being performed by another computing device, any and all of the steps may be performed by a single computing device which may be a mobile device, desktop computer, or another computing device, in accordance with the embodiments described in this disclosure. Further, any steps described herein as being performed by a particular computing device described in the specification may, in some embodiments, be performed by another computing device described in the specification, as deemed appropriate for a particular implementation.

According to some embodiments, the method 1300 may comprise receiving historical image data of a location at a first time, at 1302, and receiving real-world image data of the location at a second time, at 1304. The method 1300 may further comprise generating comparative AR content based on the historical image data and the real-world image data, at 1306. The method 1300 may further comprise transmitting the comparative AR content superimposed over the real-world image data to an AR user device, at 1308.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication," as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination In some embodiments, one or more specialized machines, such as a computerized processing device, a server, a remote terminal, and/or a customer device may implement the various practices described herein. A computer system of an insurance claim processing enterprise may, for example, comprise various specialized computers that interact to analyze, process, and/or transform data as described herein The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant reserves the right to file additional applications to pursue patents for subject matter that has been disclosed and enabled but not claimed in the present application.

What is claimed is:

1. An augmented reality system comprising:
   a processor; and
   a first non-transitory computer-readable medium in communication with the processor and storing a request module comprising instructions that when executed are configured
       to receive a request for augmented reality content comprising a virtual sprinkler from a mobile content access device,
       to identify at least one environmental feature associated with the request, and
       to identify a location associated with the request;
   a second non-transitory computer-readable medium in communication with the processor and storing a service selection module comprising instructions that when executed are configured to identify an augmented reality service of a plurality of available augmented reality services, based on the identified at least one environmental feature and the identified location;
   a third non-transitory computer-readable medium in communication with the processor and storing an augmented reality generation module comprising instructions configured to execute the identified augmented reality service and to generate augmented reality content corresponding to the request; and
   a fourth non-transitory computer-readable medium in communication with the processor and storing a transmitting module comprising instructions that when executed are configured to transmit the generated augmented reality content to the mobile content access device for overlaying live image data,
   wherein the generated augmented reality content comprises a representation of a distance between the virtual sprinkler and one of the at least one identified environmental feature.

2. The augmented reality system of claim 1, wherein the request comprises an indication of a requested augmented reality service.

3. The augmented reality system of claim 2, wherein the identified augmented reality service comprises the requested augmented reality service.

4. The augmented reality system of claim 1, wherein the request comprises a request for augmented reality content comprising thermal data.

5. The augmented reality system of claim 1, wherein the request comprises a request for augmented reality content comprising engineering data.

6. The augmented reality system of claim 1, wherein the request comprises a request for augmented reality content comprising architectural data.

7. The augmented reality system of claim 1, wherein the request comprises a request for augmented reality content comprising a representation of a simulated environmental event.

8. The augmented reality system of claim 7, wherein the simulated environmental event comprises a simulation of a fire event.

9. The augmented reality system of claim 7, wherein the simulated environmental event comprises a simulation of a fire suppression event.

10. The augmented reality system of claim 1, wherein the at least one environmental feature comprises a fire suppression device.

11. The augmented reality system of claim 1, wherein the at least one environmental feature comprises a wall structure.

12. The augmented reality system of claim 1, wherein the request comprises a request for augmented reality content comprising historical image data associated with the identified location.

13. The augmented reality system of claim 1, wherein the generated augmented reality content comprises historical image data associated with the location, for overlaying live image data of the identified location.

14. The augmented reality system of claim 1, wherein the request comprises location information that indicates the identified location associated with the request.

15. The augmented reality system of claim 14, wherein the location information comprises at least one of the following:
a geocode identifying a geographical location,
global positioning system (GPS) coordinates, and
a street address.

16. The augmented reality system of claim 1, wherein the service selection module further is configured to determine that the identified location is associated with an available augmented reality service, and wherein the identified augmented reality service comprises the associated available augmented reality service.

17. The augmented reality system of claim 1, wherein the service selection module further is configured to determine that the identified at least one environmental feature is associated with an available augmented reality service, and wherein the identified augmented reality service comprises the associated available augmented reality service.

18. The augmented reality system of claim 1, further comprising:
a fifth non-transitory computer-readable medium in communication with the processor and storing an image recognition module comprising instructions that when executed are configured to identify objects in image data received from the mobile content access device,
wherein the request module further is configured to identify the at least one environmental feature associated with the request based on at least one object identified in the image data by the image recognition module.

19. The augmented reality system of claim 18,
wherein the image recognition module is further configured to calculate a distance between two identified environmental features in image data received from the mobile content access device, and
wherein the augmented reality content comprises an indication of the calculated distance for presentation in association with the two identified environmental features.

20. The augmented reality system of claim 1,
wherein the request module is further configured to receive thermal data associated with the at least one environmental feature from the mobile content access device, and
wherein the augmented reality content comprises the thermal data for displaying as overlaying a live image of the at least one environmental feature.

21. The augmented reality system of claim 1, wherein the generated augmented reality content comprises a representation of a distance between two actual environmental features.

22. An augmented reality platform server comprising:
a processor; and
a non-transitory computer-readable medium in communication with the processor and storing instructions that, when executed, cause the processor to:
receive a request for augmented reality content comprising a virtual sprinkler from a mobile content access device,
identify at least one environmental feature associated with the request;
identify a location associated with the request;
identify an augmented reality service of a plurality of available augmented reality services, based on the identified at least one environmental feature and the identified location;
execute the identified augmented reality service and generate augmented reality content corresponding to the request; and
transmit the generated augmented reality content to the mobile content access device for overlaying live image data,
wherein the generated augmented reality content comprises a representation of a distance between the virtual sprinkler and one of the at least one identified environmental feature.

23. A method comprising:
receiving a request for augmented reality content comprising a virtual sprinkler from a mobile content access device,
identifying at least one environmental feature associated with the request;
identifying a location associated with the request;
identifying an augmented reality service of a plurality of available augmented reality services, based on the identified at least one environmental feature and the identified location;
executing the identified augmented reality service and generating augmented reality content corresponding to the request; and
transmitting the generated augmented reality content to the mobile content access device for overlaying live image data,
wherein the generated augmented reality content comprises a representation of a distance between the virtual sprinkler and one of the at least one identified environmental feature.

* * * * *